Nov. 25, 1941.  E. F. WEBB  2,264,013
WINDSHIELD WIPER CONTROL
Filed June 9, 1939
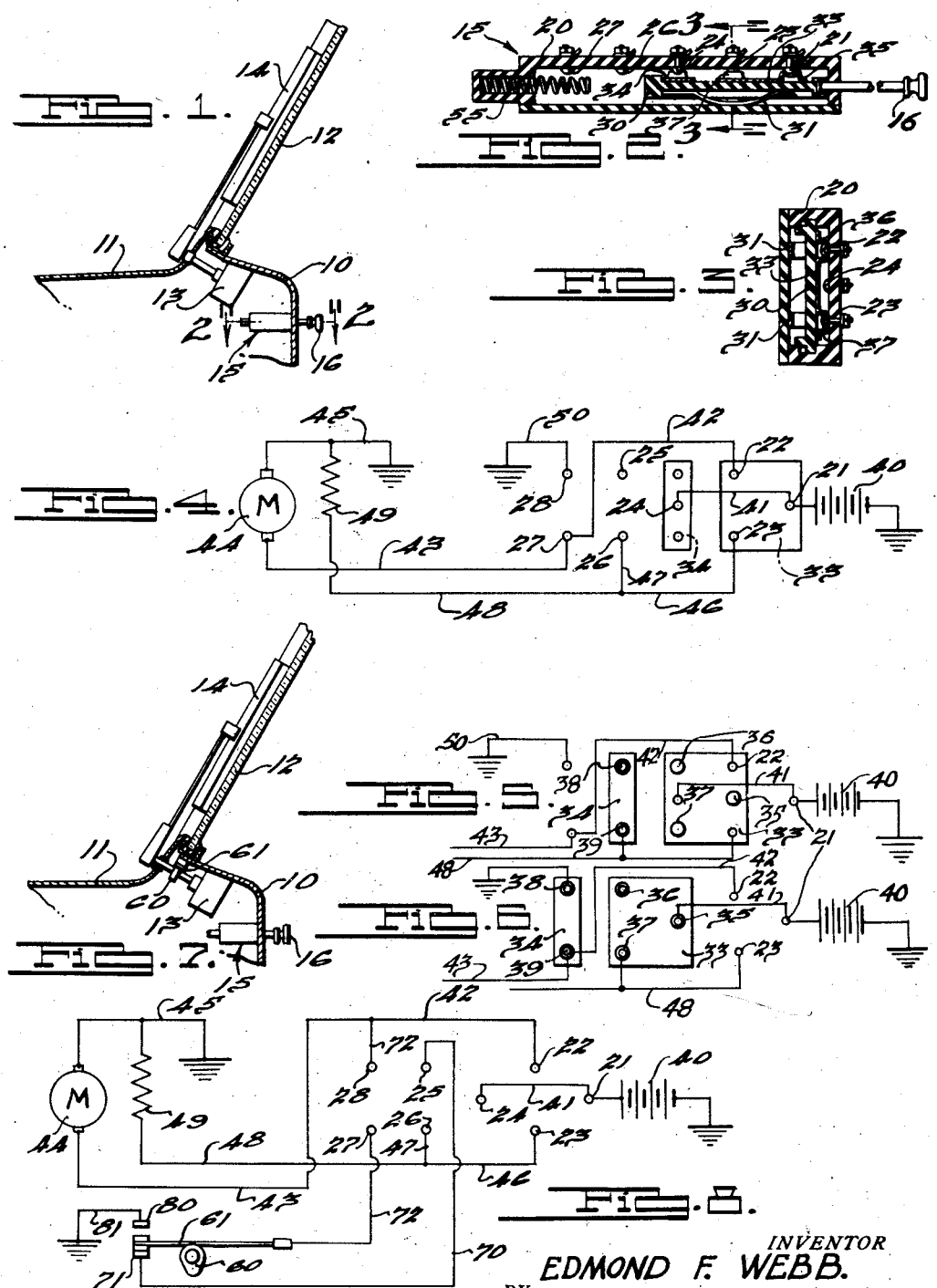
INVENTOR
EDMOND F. WEBB.
BY
ATTORNEYS.

Patented Nov. 25, 1941

2,264,013

UNITED STATES PATENT OFFICE 2,264,013

WINDSHIELD WIPER CONTROL

Edmond F. Webb, Franklin Village, Mich., assignor to Chrysler Corporation, Highland Park, Mich., a corporation of Delaware Application June 9, 1939, Serial No. 278,289

9 Claims. (Cl. 15—255)

The present invention relates to an improvement in windshield wipers for automobiles and other vehicles, the improvement comprising means whereby the usual windshield wiper may be "parked" in a position such as not to obscure the operator's vision. The invention comprises an improved control means for an electrically driven windshield wiper whereby the wiper may be manually or automatically stopped in the desired position. The improved control means comprises a simple, easily manufactured three-position switch and a control circuit therefor whereby the windshield wiper may be placed in operation, caused to cease operation, and "stalled," in order that the object of the invention may be achieved.

The invention is disclosed in two forms, one of which may be designated as manually controlled, in which form the vehicle operator may "stall" the wiper and then "inch" it into the desired position in case the "stalling" occurs at an undesirable position; and in the other of which the circuit includes automatic timing means whereby "stalling" is caused to occur only when the windshield wiper has reached the desired position.

The objects and advantages of the invention should be more readily apparent following a study of the following specification and the accompanying drawing wherein like numerals refer to like parts throughout.

In the drawing, Fig. 1 discloses the manual embodiment of the invention;

Fig. 2 is a vertical section through the switch of the present invention, taken along line 2—2 of Fig. 1;

Fig. 3 is a cross-section through the switch, taken along line 3—3 of Fig. 2;

Fig. 4 is a wiring diagram showing the circuit whereby the form disclosed in Fig. 1 is controlled and illustrating the parts in a running position;

Fig. 5 is a fragmentary wiring diagram similar to Fig. 4 showing the position of the control member with relation to the switch contact points when the windshield wiper is not operating;

Fig. 6 is a view similar to Fig. 5 showing the control member in the "stalled" position;

Fig. 7 is a view similar to Fig. 1 showing the modified form of the invention wherein automatic means is disclosed for "stalling" the windshield wiper in the desired position; and, Fig. 8 is a wiring diagram for the form of the invention disclosed in Fig. 7.

Referring to Figs. 1 to 6, inclusive, there is disclosed a portion 10 of a vehicle instrument panel and a portion 11 of a vehicle body, together with a portion 12 of the windshield of the vehicle. A conventional, electrical windshield wiper motor 13 is mounted in the usual manner and operates a conventional windshield wiper 14. The motor 13 is controlled by a three-position switch 15 having a control operating button 16 protruding through the surface of the instrument panel. The switch 15 comprises a body 20 on which are mounted contact points 21 to 28, inclusive, and an insulated control member 30 attached to the control button 16 and slidably mounted within the body 20. The control member is provided with resilient means 31 whereby contact sockets carried thereby are urged against the contact points mounted on the body of the switch. The control member 30 is provided with a contact plate 33 and a shunt 34, the former being provided with contact sockets 35 to 37, inclusive, and the latter being provided with contact sockets 38 and 39.

Contact point 21 is connected to one terminal of battery 40, the other terminal of which is grounded in the usual manner, and a jumper 41 joins contact point 21 to contact point 24. A wire 42 joins contact point 22 to contact point 27, and a wire 43 joins contact point 27 to the armature 44 of the windshield wiper motor 13, from which wire 45 leads to ground. Contact points 23 and 26 are connected by wires 46 and 47 to a common junction from which wire 48 leads through the field 49 of motor 13 from which wire 45 leads to ground. Contact point 28 is grounded through wire 50.

In the position of the control member shown in skeleton outline in Fig. 4, the motor is in operation due to completion of the following circuits; from battery to contact point 21 which engages contact socket 35, through contact plate 33 to contact socket 37 which engages contact point 23, through wires 46 and 48 to motor field 49, and wire 45 to ground, which energizes the motor field; and from battery 40 to contact point 21 engaging contact socket 35, through contact plate 33 to contact socket 36 which engages contact point 22, through wire 42 to contact point 27 and wire 43 to motor armature 44, and through wire 45 to ground, which energizes the motor armature.

When the control member is in the position relatively set forth in Fig. 5, the mechanism is in its "off" position because contact socket 35 is midway between contact points 21 and 24, which are the only contact points connected to battery 40.

When the contact member is in its innermost position, as relatively shown in Fig. 6, the motor is "stalled" due to completion of the following circuits: from battery 40 through contact point 21, wire 41, and contact point 24 to contact socket 35, through contact plate 33 to contact socket 37 and contact point 26, through wire 47 and wire 48 to motor field 49, and wire 45 to ground, which energizes the motor field; and from armature motor 44 through wire 43 to contact point 27 which is engaging contact socket 39, through shunt 34, contact socket 38, and contact point 28, through wire 50 to ground and from ground through wire 45 to the armature motor 44, which short-circuits the armature of the motor, whereby the motor is "stalled" and held in a fixed position.

A spring 55 is mounted in the innermost extremity of the switch body 20 and is of such character as to return the control member 30 to the central or "off" position as soon as the operator releases the control button 15 after pushing the control member 30 into its innermost position. The spring 55 comprises means automatically to return the switch to "off" position after being placed in "stall" position.

In the operation of this form of the invention the operator pulls the control button 16 outward to the "on" position whereupon the armature and field circuits are completed and the windshield wiper operates. When he desires to stop the windshield wiper the operator merely pushes the control button 16 to the "off" position; but if he wishes to "park" the windshield wiper carefully in a desired position he will push against spring 55 when the "stall" position is reached which causes grounding of the armature while the field is energized, thus immediately stopping the windshield wiper. Upon release of the control button 16 the switch automatically returns to the "off" position. If it is found that the wiper has stopped in an undesirable position, the control may be rapidly operated from "on" to "stall" position so as to move the wiper in short steps to the desired position.

In the form of the invention disclosed in Figs. 7 and 8 the "parking" of the windshield wiper at the desired position is accomplished automatically by means of an automatic timing device in series with the "stall" contacts of the three-way switch, which automatic timing device comprises a cam-driven switch. In Fig. 7 the cam 60 is shown as fixed to the wiper operating shaft and as engaging a switch bar 61 having double contacts for a purpose to be presently explained.

When the switch is in the "on" position the circuit through the motor armature and the motor field is accomplished in the same manner as previously explained. Thus the motor field circuit comprises battery 40, contact point 21, contact socket 35, contact plate 33, contact socket 37, contact point 23, wire 46, wire 48, motor field 49, wire 45 to ground; and the motor armature circuit comprises battery 40, contact point 21, contact socket 35, contact plate 33, contact socket 36, contact point 22, wire 42, wire 43, armature 44, and wire 45 to ground.

When the control member is in the "off" position all circuits are deenergized, since no switch member is in contact with the battery terminal contact points 21 or 24.

When the switch control member is pushed to its innermost position, at which the windshield wiper motor is "stalled," the following circuits are completed: from battery 40 through wire 41 and contact point 24 to contact socket 35, through contact plate 33, contact socket 36, contact point 25 to a wire 70 which leads to a contact 71 engaged by switch 61, through switch 61 and wire 72 to contact point 27, through contact socket 39, shunt 34, contact socket 38, contact point 28, wire 72, and wire 43, through motor armature 44 and wire 45 to ground, whereby the motor armature is energized. At the same time a circuit is completed from battery 40 through wire 41 to contact point 24, through contact socket 35, plate 33 and contact socket 37 to contact point 26, through wire 47 and wire 48 to motor field 49 and wire 45 to ground, whereby the motor field is energized. Due to the operation of the motor 13, the cam 60 raises and lowers the switch arm 61, and the high point of cam 60 is so arranged as to break the motor armature circuit previously described and complete a motor "stalling" circuit when the windshield wiper is in the proper position. When the switch arm 61 is raised, it makes contact with a contact member 80 connected by wire 81 to ground. Hence the motor armature is short-circuited by the circuit including wire 81, contact 80, switch arm 61, wire 72, shunt 34, wire 43, armature 44, and wire 45 to ground. The windshield wiper is thus held in the desired position, and when the operator releases pressure on the control button 15 the spring 55 returns the control member 30 to the central or "off" position. This modification of the invention eliminates the necessity for manually operating the switch until the blade moves to the desired position, since stalling occurs only when the blade reaches the desired position.

Having described and illustrated two embodiments of my invention, it should be apparent to those skilled in the art that the same permits of modifications in arrangement and detail. All such modifications as come within the scope of the following claims are considered to be a part of my invention.

I claim:

1. A control system adapted to control an operating motor for a windshield wiper blade including a source of power, a circuit for simultaneously supplying current from said source to the field and armature of said motor to cause operation of the latter, a circuit for short-circuiting said armature and simultaneously supplying current to said field to stall said motor in order to park the blade in a selected position, and a switch in said control system having contacts so constructed and arranged when said switch is in one position as to close only said second mentioned circuit for stalling said motor and arresting said blade at a desired position thereof.

2. A control system adapted to control an operating motor for a windshield wiper blade including a source of power, a circuit for simultaneously supplying current from said source to the field and armature of said motor to cause operation of the latter, a circuit for short-circuiting said armature and simultaneously supplying current to said field to stall said motor in order to park the blade in a selected position, and a three position switch in said control system having contacts so constructed and arranged as to close only said first mentioned circuit to establish operation of said motor when said switch is in one position, to close only said second mentioned circuit for stalling said motor when said switch is in another position, and to open both of said circuits when said switch is in its third position.

3. A control system adapted to control an operating motor for a windshield wiper blade including a source of power, a circuit for simultaneously supplying current from said source to the field and armature of said motor to cause operation of the latter, a circuit for short-circuiting said armature and simultaneously supplying current to said field to stall said motor in order to park the blade in a selected position, and a three position switch in said control system having a fixed element provided with a set of contacts and a manually shiftable element provided with a cooperating set of contacts so constructed and arranged as to close only said first mentioned circuit when said shiftable element is in one limiting position, to close only said second mentioned circuit when said shiftable element is in an opposite limiting position and to open both of said circuits when said shiftable element is in an intermediate position, said switch including a resilient abutment for yieldably opposing movement of said shiftable element to and automatically returning the same from said last mentioned limiting position.

4. A control system adapted to control an operating motor for a windshield wiper blade including a source of power, a circuit for simultaneously supplying current from said source to the field and armature of said motor to cause operation of the latter, a circuit for short-circuiting said armature and simultaneously supplying current to said field to stall said motor in order to park the blade in a selected position, and a switch in said control system having a fixed set of contacts and a manually shiftable element provided with a cooperating set of contacts so constructed and arranged as to open both of said circuits when in one position and to close only said second mentioned circuit when in another position, said switch including resilient means for automatically returning said shiftable element from said last mentioned position to said first mentioned position.

5. A windshield wiper parking mechanism for the purpose of causing a windshield wiper to move to a predetermined position and remain there, comprising an electrical windshield wiper motor, a control circuit for said wiper motor including a three-position switch, one position thereof including connections for closing a portion of said circuit to condition the same to subsequently short-circuit the motor armature and connections for simultaneously energizing the motor field, and a second position thereof being the off position of said switch, and resilient means for automatically moving said switch from said one position to said second position; in combination with a second control circuit for energizing the motor armature when said switch is in said one position, and an automatic timing mechanism for breaking said second control circuit and short-circuiting the motor armature through said previously closed portion of said circuit when the windshield wiper arrives at a predetermined position whereby said motor is stalled with the windshield wiper at said predetermined position.

6. A windshield wiper parking mechanism for the purpose of causing a windshield wiper to move to a predetermined position and remain there, comprising an electric windshield wiper motor, control circuits therefor including a circuit for energizing the motor armature and a circuit for energizing the motor field, a switch movable to one position for completing said circuits, and automatic timing means for short-circuiting the armature when the windshield wiper arrives at said predetermined position, said timing means comprising a cam driven in unison with said windshield wiper.

7. A windshield wiper parking mechanism for the purpose of causing a windshield wiper to move to a predetermined position and remain there, comprising an electric windshield wiper motor, control circuits therefor including a circuit for energizing the motor armature and a circuit for energizing the motor field, a switch movable to one position for completing said circuits, and automatic timing means for short-circuiting the armature when the windshield wiper arrives at said predetermined position, said timing means comprising a cam fixed to the driving shaft of said windshield wiper.

8. A windshield wiper parking mechanism for the purpose of causing a windshield wiper to move to a predetermined position and remain there, comprising an electric windshield wiper motor, control circuits therefor including a circuit for energizing the motor armature and a circuit for energizing the motor field, a switch movable to one position for completing said circuits, and automatic timing means for short-circuiting the armature when the windshield wiper arrives at said predetermined position, said timing means comprising a cam fixed to the driving shaft of said windshield wiper; in combination with resilient means for moving said switch from said one position to a neutral position.

9. A control system for a windshield wiper blade operating motor including a source of power, a circut for simultaneously supplying current from said source to the field and armature of said motor to cause operation of the latter, a circuit for short-circuiting said armature and simultaneously supplying current to said field to stall said motor and park the blade operated thereby in a predetermined position, a switch manually movable to one position for completing said first mentioned circuit to establish operation of said motor, said switch being movable to another position for preparing said second mentioned circuit to be subsequently closed, and automatic timing mechanism for closing said second mentioned circuit to short-circuit said armature when said wiper blade arrives at a predetermined position.

EDMOND F. WEBB.